(No Model.) 2 Sheets—Sheet 1.

G. KEIZER.
SPADER OR DIGGER.

No. 510,266. Patented Dec. 5, 1893.

WITNESSES
G. S. Elliott
E. M. Johnson

Gottliep Keizer
INVENTOR
by — Attorney (No Model.) 2 Sheets—Sheet 2.
G. KEIZER.
SPADER OR DIGGER.
No. 510,266. Patented Dec. 5, 1893.
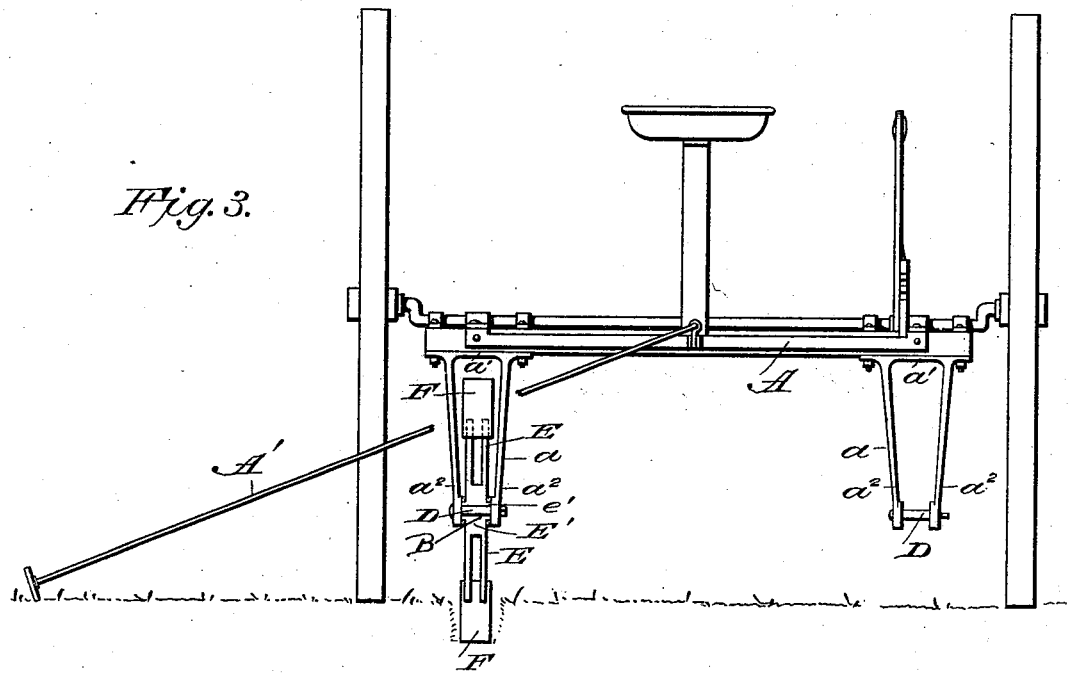
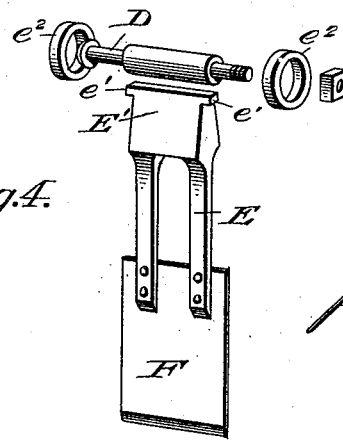
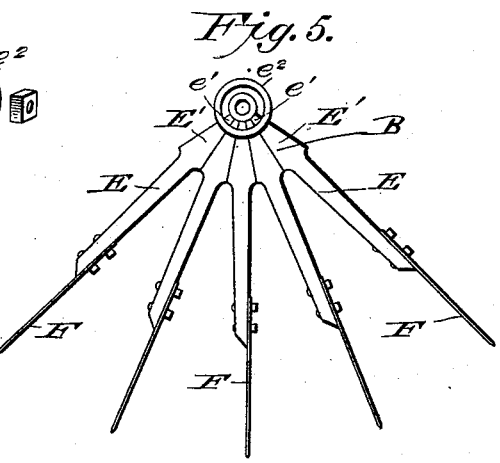
WITNESSES
L. S. Elliott
E. W. Johnson
Gotliep Keizer
INVENTOR
by
Attorney

UNITED STATES PATENT OFFICE.

GOTLIEP KEIZER, OF BREWSTER, NEBRASKA.

SPADER OR DIGGER.

SPECIFICATION forming part of Letters Patent No. 510,266, dated December 5, 1893.

Application filed September 21, 1893. Serial No. 486,105. (No model.)

*To all whom it may concern:*

Be it known that I, GOTLIEP KEIZER, a citizen of the United States of America, residing at Brewster, in the county of Blaine and State of Nebraska, have invented certain new and useful Improvements in Spaders or Diggers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in rotary diggers or spaders.

The object of the invention is to provide a device which will dig and loosen the soil in front of the seed dropping mechanism when it is applied to a corn-planter, or which may be used independently of a corn-planter for loosening the soil in rows prior to dropping seed thereon, and the invention consists in providing a carrying frame with revolving diggers made up of two sets of parallel spokes or arms which are connected together to form a hub which is loosely journaled to a supporting frame, the outer ends of the arms carrying plates or spades which are bolted thereto so that they can be readily removed for sharpening, as will be hereinafter fully set forth and particularly pointed out in the claims.

Figure 1:
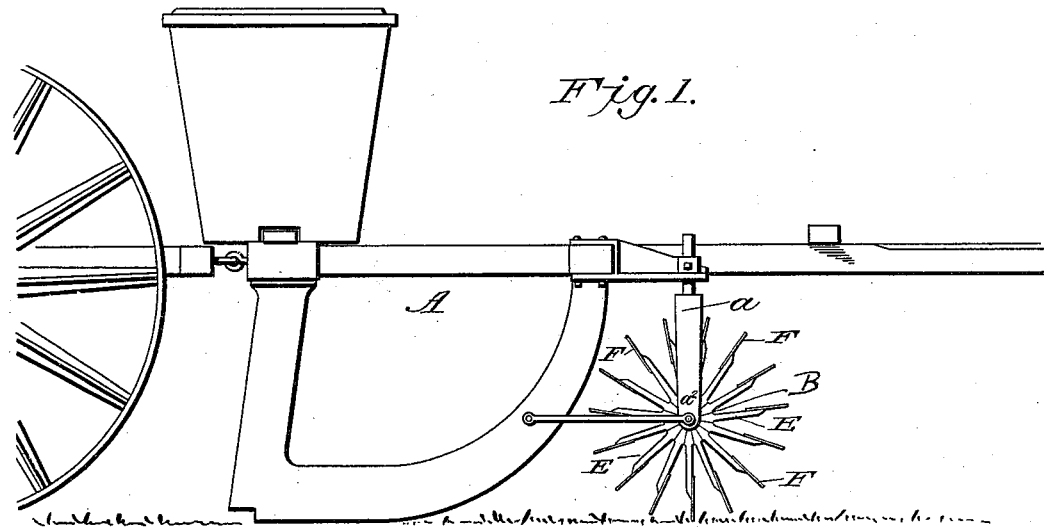
Figure 2:
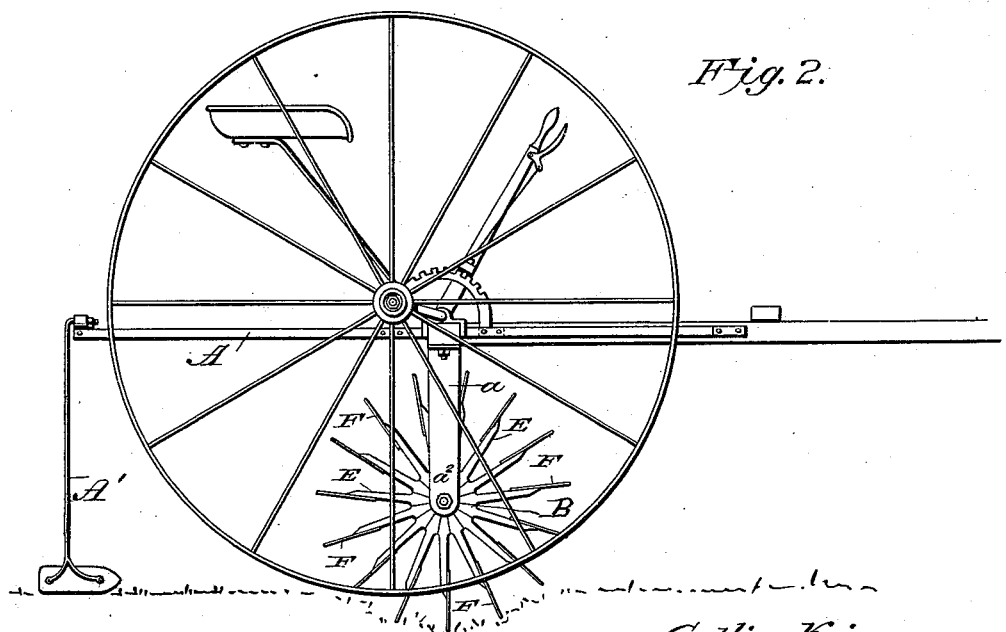

In the accompanying drawings, forming part of this specification, Figure 1 is a side elevation showing the application of my invention to a corn-planter of ordinary construction, the spaders or diggers being located in front of the runners. Fig. 2 is a side view showing the spaders or diggers applied to an independent frame. Fig. 3 is a rear elevation. Fig. 4 is a detail perspective view, and Fig. 5 is a detail side view.

A designates a supporting frame which may be of any suitable construction, either the front part of a seed or corn-planter or a sulky frame as shown in Fig. 2. When an independent frame is used it is preferred to provide the same with a land-marker of any approved construction, one form being represented on the drawings and designated by the letter A'.

$a\ a$ designate supporting frames for the rotary spaders which consist of a plate or body portion $a'$ which is bolted to a part of the machine to which the device is attached and is provided with depending arms or hangers $a^2$ the lower ends of which have bearings for a shaft D upon which the rotary spader is journaled.

B designates a hub of any approved construction and of such size that it may be placed between the lower ends of the depending arms $a^2$. From this hub radiate a double set of spokes or arms E, each pair being connected by the part E', said connecting portion being tapered and provided with laterally extending parts $e'$ over which the bands $e^2$ lie to connect the parts which make up the hub. To the outer ends of each pair of spokes E is bolted a blade F, said blade being preferably bolted to the spokes so that it may be readily removed for sharpening. The blades are adapted to enter the soil and loosen the same and the spader is revolved as the frame of the machine is drawn across the ground.

The device hereinbefore described may be used for opening up rows prior to planting the seed or may be used on each side of the growing plants for weeding and loosening up the soil.

The device is especially adapted for use in loose sandy soil where after plowing and cultivating prior to planting the wind is apt to blow the sand across the rows in which the seed is planted, and, after said seed has sprouted, against the young sprouts, the sand cutting and injuring the plants to retard or entirely prevent their growth.

With this device the soil is only loosened on a line where the seed is planted and consequently there will be less area of soil to be acted upon by the wind.

Having thus described my invention, what I claim as new, and desire to secure by Letters Patent, is—

1. A spader or rotary digger comprising a support having depending arms and adapted to be secured to a frame, a hub journaled on a shaft supported at the lower ends of the arms, a double set of spokes each pair of which are connected by a tapered portion which is let into the hub, together with blades removably attached to the outer ends of each pair of spokes, substantially as shown, and for the purpose set forth.

2. A spader or rotary digger comprising a support from which depend arms, a series of spokes the sides of the inner ends of which are tapered so as to abut against the adjacent spokes, means for connecting the inner ends of said spokes to each other so as to form a hub, the outer ends of the spokes having blades attached thereto, substantially as shown.

3. An agricultural implement consisting of a frame having independent hangers adjacent to each side thereof, each hanger carrying independent spaders the blades of which enter the soil approximately on a vertical line with the points of connection of said hangers with the frame, substantially as shown.

4. A hanger comprising a body portion which is adapted to be secured to a frame and depending arms $a^2$, a shaft having bearing in the lower ends of the arms $a^2$, a rotary spader made up of a series of cross-pieces $E'$ which revolve around the shaft, spokes E E projecting from the cross-pieces $E'$, and blades F connected to the outer ends of the spokes, said blades extending on each side beyond the spokes, substantially as shown.

In testimony whereof I affix my signature in presence of two witnesses.

GOTLIEP KEIZER.

Witnesses:
E. H. RIGGS,
W. E. SWINGEL.